United States Patent [19]
Kolar et al.

[11] Patent Number: 5,872,555
[45] Date of Patent: Feb. 16, 1999

[54] METHOD AND APPARATUS FOR CUSTOMIZING COLORS IN A DATA PROCESSING SYSTEM

[75] Inventors: Ramachandran Nagaraja Kolar, Santa Clara, Calif.; Rene Lim Llames, Austin, Tex.; Paula Jean Moreland, Austin, Tex.; Thomas Robert Murphy, Austin, Tex.

[73] Assignee: International Business Machines Corporation, Armonk, N.Y.

[21] Appl. No.: 736,557

[22] Filed: Oct. 24, 1996

[51] Int. Cl.⁶ .................................................. G05G 1/28
[52] U.S. Cl. ................................. 345/150; 345/431
[58] Field of Search ............................. 345/431, 150, 345/153

[56] References Cited

U.S. PATENT DOCUMENTS

| | | | |
|---|---|---|---|
| 5,334,992 | 8/1994 | Rochat et al. | 345/150 |
| 5,371,844 | 12/1994 | Andrew et al. | 345/326 |
| 5,617,528 | 4/1997 | Stechmann et al. | 345/334 |

OTHER PUBLICATIONS

IBM Technical Disclosure Bulletin, vol. 27 No. 9 Feb. 1985, Operator–Selectable Color Definitions For Word Processing Fields and Symbols.

IBM Technical Disclosure Bulletin, vol. 37 No. 02B Feb. 1994, Method of Edit Color Replacement For Use With Bitmaps.

IBM Technical Disclosure Bulletin vol. 30 No. 8 Jan. 1988, Field and Color status Menu Driver.

IBM Technical Disclosure Bulletin, vol. 29 No. 6 Nov. 1986, Dynamic Selection of Foreground and Background Colors For System Messages.

*Primary Examiner*—Almis R. Jankus
*Assistant Examiner*—Huedung Cao
*Attorney, Agent, or Firm*—David A. Mims, Jr.

[57] ABSTRACT

A method and apparatus for editing the custom colors from a Quick Color Selector on a personal computer desktop. An Edit Custom Colors button is provided on the Quick Color Selector. Activating this button causes a Color Editor to appear, either as a separate window or as an expansion of the Quick Color Selector. This invention also provides for a user to specify which custom color chip is to be edited (the target chip). In particular, navigation controls are provided that enable the user to move an identifying cursor across an array of custom color chips. The navigation controls may appear in the Quick Color Selector or in a Color Editor. The Quick Color Selector still exhibits its expected transient behavior in that it, together with any separate Color Editor window, disappears immediately after the user selects a color chip.

12 Claims, 5 Drawing Sheets

METHOD AND APPARATUS FOR CUSTOMIZING COLORS IN A DATA PROCESSING SYSTEM

FIELD OF THE INVENTION

The present invention relates to data processing systems, and in particular, to a user interface for specifying and customizing color selections on a display in a data processing system.

BACKGROUND OF THE INVENTION

Personal computers with color displays are becoming increasingly common in the workplace and home today. The increasing use of color displays and other color hardware, such as printers, is associated with the increasing use of, and provision for, color in software, such as operating systems, graphical user interfaces, and applications. Providing the user with the ability to specify colors is highly desirable, if not absolutely necessary.

For example, the most widely used operating systems or user interface systems today are based on the windows and desktop concepts such as the IBM Operating System/2 (OS/2), Macintosh OS, Microsoft Windows, and X/Motif. In such window systems, it is desirable for users to be able to customize the color of various window parts, such as the border, background, title bar, title bar text, etc., to suit their individual preferences.

In any application that displays text, such as a word processing, desktop publishing application or a browser, it is desirable to use color to highlight certain words or to clarify structure, such as hypertext links, items in outlines, or keywords in programming code. It would be desirable for the user to be able to specify what colors to use in highlighting the text, or in the color-coding scheme.

In applications where color is an integral element, such as in a graphics, image editing application, or in a data visualization application, it is clearly necessary for the user to be able to specify colors. A typical approach to allowing the user to select a color is to display a set of fixed color samples and a set of custom color samples in a dialog window. By "custom" we mean customizable, user-definable, or user-editable, as distinguished from "fixed" colors whose definition cannot be changed by the user, either easily or at all. For the purpose of this application, these terms will be considered synonymous: color selection dialog, color selection dialog window, color selector, and color palette. A color sample will be also referred to as a color "chip."

Two forms of color selection dialog are usually available. The first form will be referred to as a Persistent Color Selector. In this form, the dialog window is relatively long-lived. It remains visible and available for interaction until the user explicitly dismisses it, such as by clicking on a Cancel button. The second form will be referred to as a Quick Color Selector. In this form, the dialog window is relatively short-lived. It disappears immediately after a color sample is selected. For the purpose of this application, the essential distinction between the two forms has to do with whether clicking on (or otherwise activating) a color sample causes the dialog to disappear. In the Persistent form, clicking on a color sample does not dismiss the dialog. An explicit user action is required to dismiss the dialog. In the Quick form, clicking on a color sample dismisses the dialog and effects the color selection. The Quick form is usually more compact. In typical usage, it is seen for only a short time as compared with the Persistent form, which stays up on the screen as the user does various tasks.

Another difference is, that the Persistent Color Selector will usually provide a way for the user to edit the set of custom colors, while the Quick form will not. Both forms will show the fixed and custom color chips, but only the Persistent form will enable the custom colors to be edited. For example, the Persistent Color Selector may show an Edit Custom Colors (or similarly named) button. Activating this button either expands the dialog window to include an interface for editing the custom colors, or makes a separate dialog window appear, containing the color editing interface.

An interface for defining or editing custom colors is referred to as a Color Editor. It may appear as a separate window or as an expansion of a color selection dialog window. It typically contains controls which allow the user to define a custom color according to one or more color specification models, such as the RGB (red-green-blue), CMY (cyan-magenta-yellow), HSB (hue-saturation-brightness), or HSL (hue-saturation-luminosity) models. For example, in the RGB model, a color is defined by specifying its composition in terms of three primary colors—red, green, and blue.

As stated above, the Persistent Color Selector usually provides a way to invoke the Color Editor, but the Quick Color Selector does not. It is desirable for the Quick form to provide this functionality, but no solution is known in the prior art. This function is desirable because it gives the user more flexibility. It also results in more consistency between the Persistent and the Quick forms of color selection dialogs.

It is not enough to add an Edit Custom Colors button to the Quick Color Selector. Provisions are needed for allowing the user to specify which custom color chip is to be edited (the "target" chip, so called because it is the target of the Color Editor). The target chip cannot be specified by clicking on it because this action should, if the expected behavior of the Quick Color Selector is to be maintained, have the effect of finalizing the color selection and dismissing the dialog. Note that in the Persistent Color Selector, the target chip can be specified by clicking on it, because doing so neither finalizes the color selection nor dismisses the dialog.

It is therefore desirable to have a method and apparatus for specifying and customizing color selections on the Quick Color Selector on a personal computer desktop.

SUMMARY OF THE INVENTION

This invention relates to a method and apparatus for editing the custom colors from a Quick Color Selector on a personal computer desktop. An Edit Custom Colors button is provided on the Quick Color Selector. Activating this button causes a Color Editor to appear, either as a separate window or as an expansion of the Quick Color Selector. This invention also provides for a user to specify which custom color chip is to be edited (the target chip). In particular, navigation controls are provided that enable the user to move an identifying cursor across an array of custom color chips. The navigation controls may appear in the Quick Color Selector or in the Color Editor. The Quick Color Selector still exhibits its expected transient behavior in that it, together with any separate Color Editor window, disappears immediately after the user selects a color chip.

Navigation controls are also applicable to the Persistent Color Selector, where they provide for consistency with the Quick Color Selector, and allow the user to specify the target color chip independently of the currently selected color chip.

DETAILED DESCRIPTION OF THE EMBODIMENTS

This invention provides a graphical user interface for specifying and customizing color selections on the desktop of a data processing system. The invention will be more fully described using the following drawings.

Figure 1:
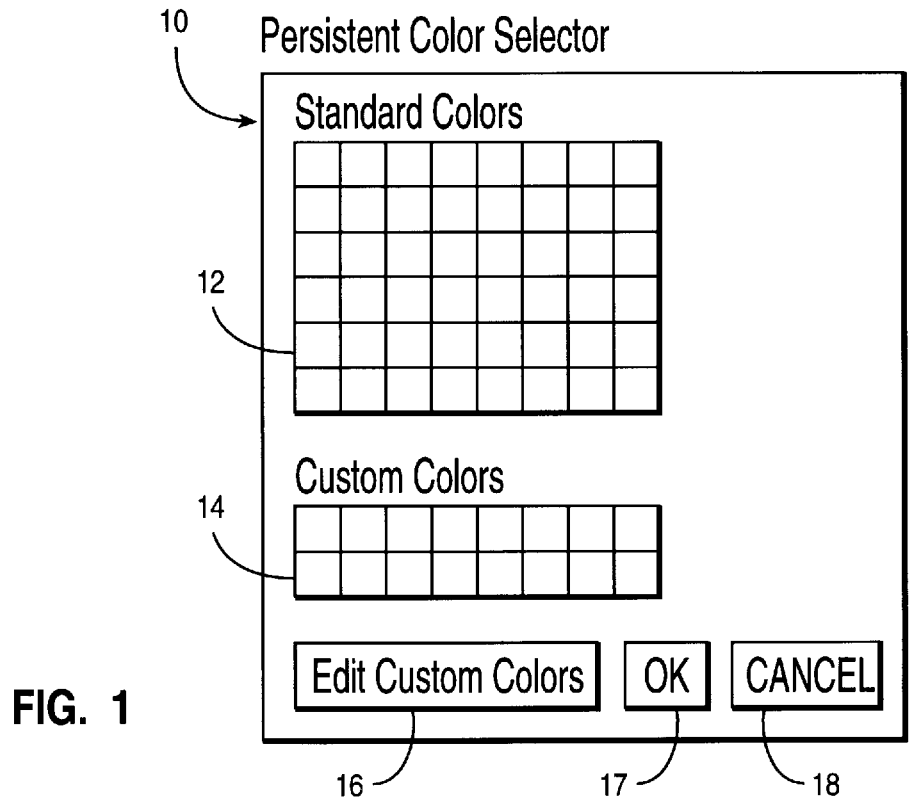
FIG. 1 depicts a persistent color selector on the desktop of a data processing system.

Referring to FIG. 1, there is shown a Persistent Color Selector 10 displayed in a dialog box on the desktop of a computer. The Persistent Color Selector 10 contains an array of standard color samples 12, and an array of custom color samples 14. Each-sample of the standard colors 12, consists of a predefined color such as red, green, blue, purple, black, white, etc. Likewise, each sample of the custom colors 14, consists of colors created by the user (e.g., mixtures of the standard colors). A button 16, is provided in the Persistent Color Selector 10, for editing/defining the custom colors. As appreciated by those skilled in the prior art, a user indicates the desired color by selecting the sample containing the color. The Persistent Color Selector 10 also contains a Cancel button 18 for explicitly dismissing/terminating the color selection dialog. In addition, an OK button 17 is provided which permits the user to make multiple color selections within the Persistent Color Selector 10 without exiting the color selection dialog.

Figure 2:
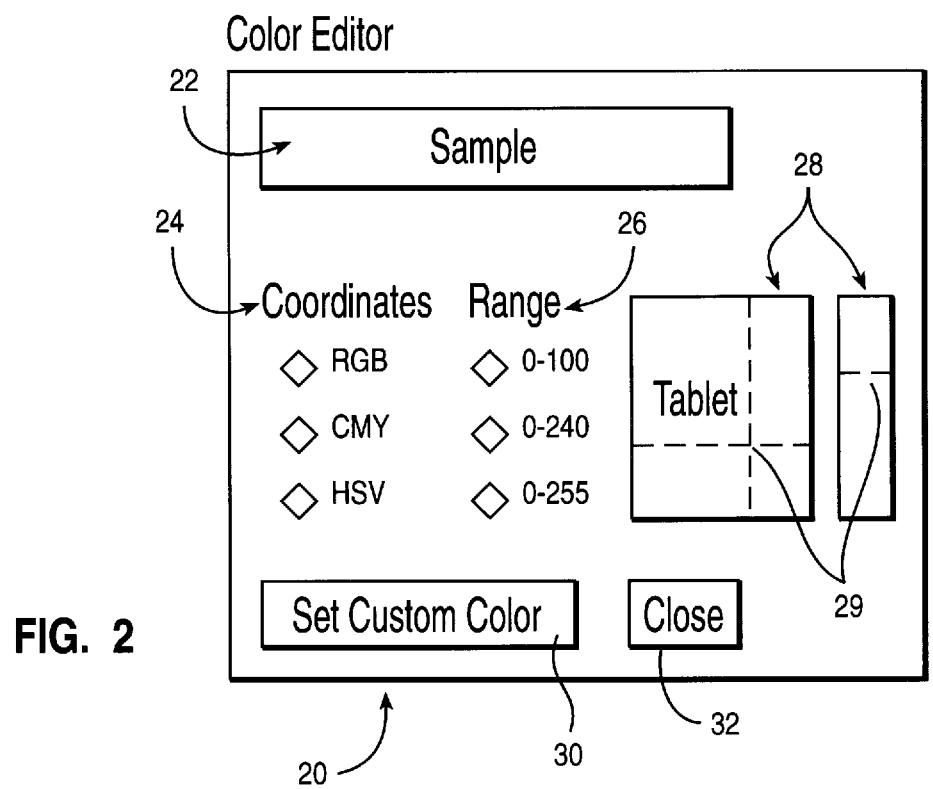
FIG. 2 is a color editor for editing/defining custom colors on the desktop of a data processing system.

Referring now to FIG. 2, there is shown a Color Editor 20 for editing/defining custom colors in a manner well known in the prior art. The Color Editor 20 contains a button 30 for setting a particular custom color in the color selector after the desired color has been defined. A window 22 is provided for displaying the custom color created by the user. The user defines the custom color by selecting a color coordinate system (color specification model), such as RGB (Red, Green, Blue), CMY (Cyan-Magenta-Yellow), or HSV (Hue, Saturation, Value), using the buttons 24. A range for the appropriate coordinates may also be specified by the user using the buttons 26. Graphic tablets 28 show the available spectrum of colors and allow a color to be defined by manipulating a crosshair 29 in each tablet. The Color Editor 20 also contains a Close button 32 for dismissing the editor.

Figure 3:
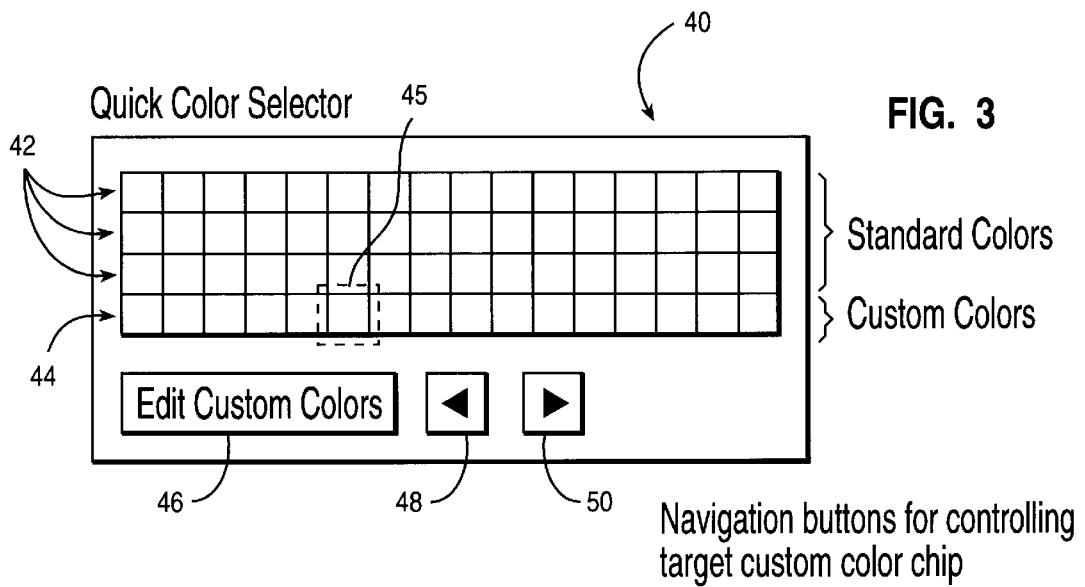
FIG. 3 is a Quick Color Selector of this invention where custom colors are editable on the desktop of a data processing system.

Referring now to FIG. 3, there is shown a Quick Color Selector 40 of this invention. The Quick Color Selector 40 contains an array of standard color samples 42, and an array of custom color samples 44. An Edit Custom Colors button 46 is provided to enable the user to create or edit the custom colors. In addition, the Quick Color Selector 40 contains navigation buttons 48 and 50. Navigation button 48, when activated, causes an on screen position indicator (e.g., cursor 45) to move to the left one chip at a time across the custom color chips. Likewise, navigation button 50 causes the cursor 45 to move to the right one chip at a time. The cursor 45 specifies which custom color chip is being edited (i.e., the target chip).

Figure 6:
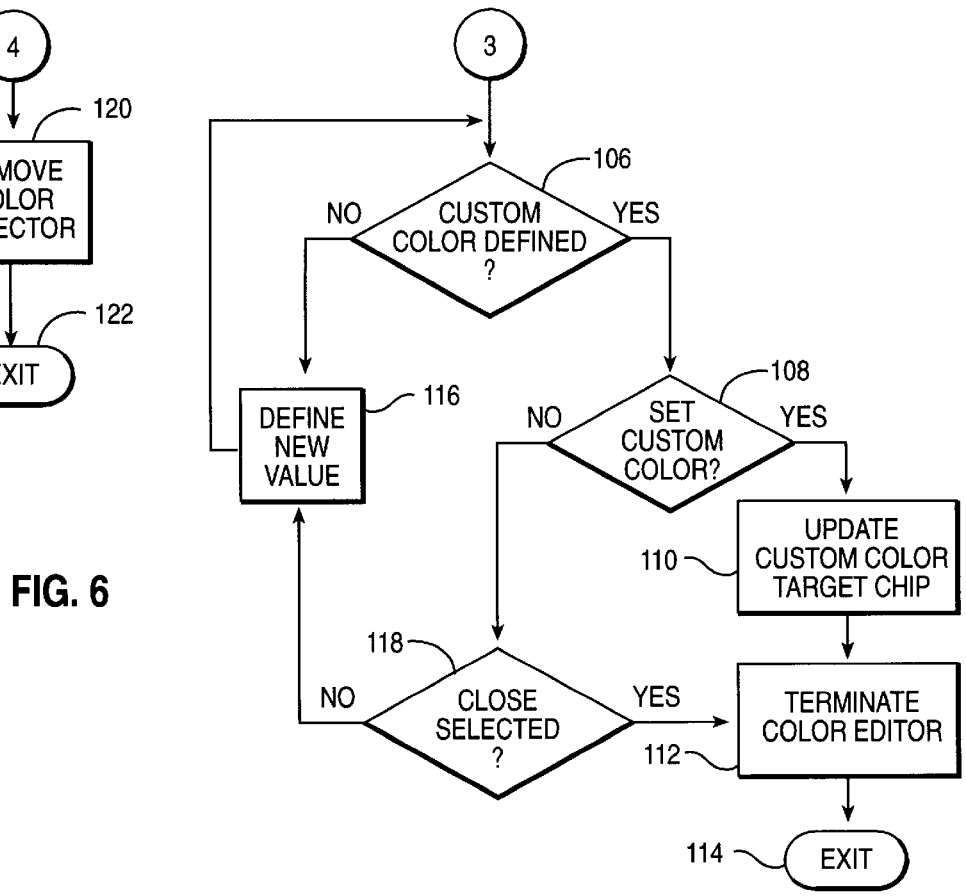
FIGS. 4–6 are flow diagrams for editing/defining custom colors using the invention.
Figure 4:
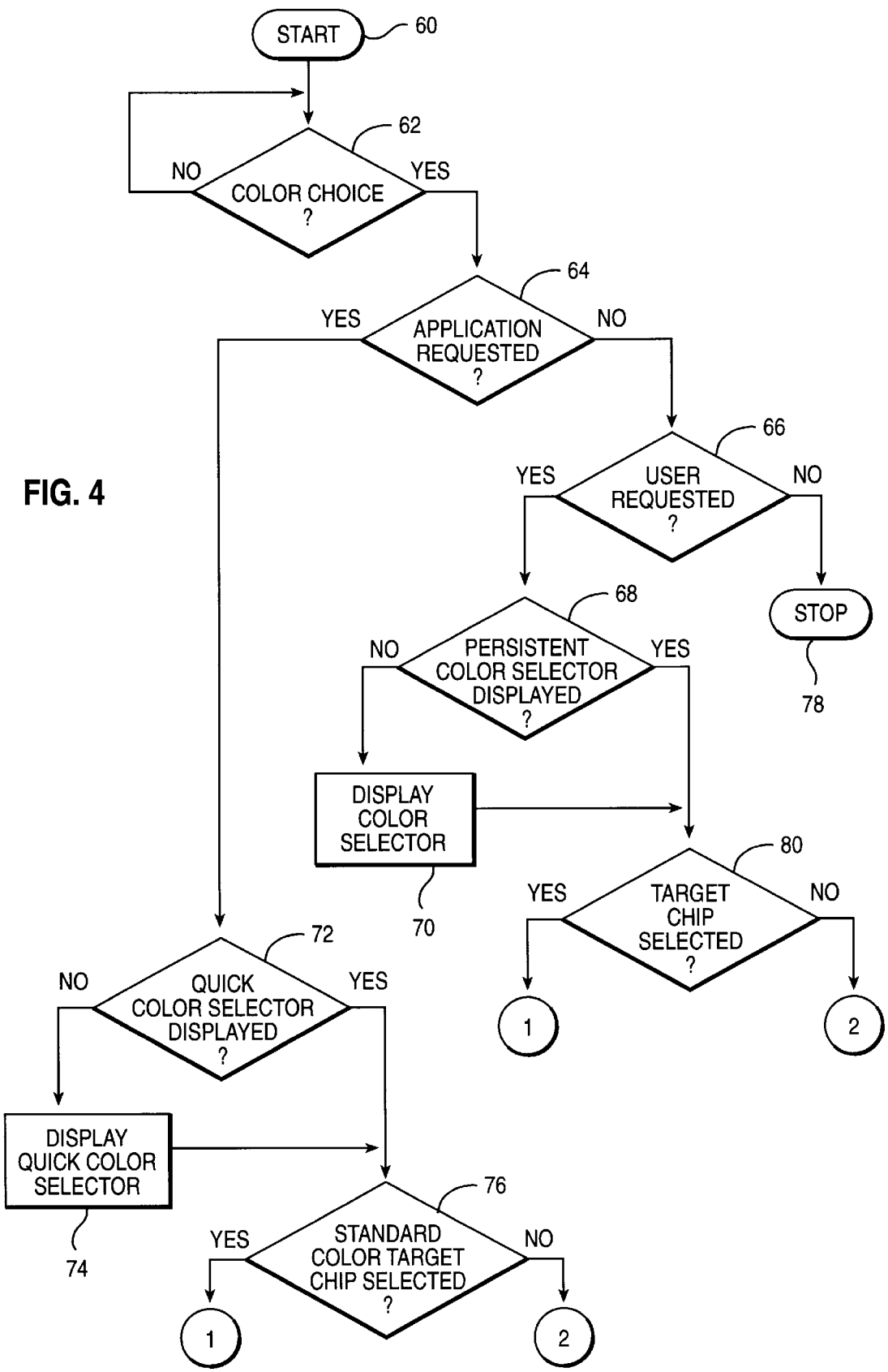
Figure 5:
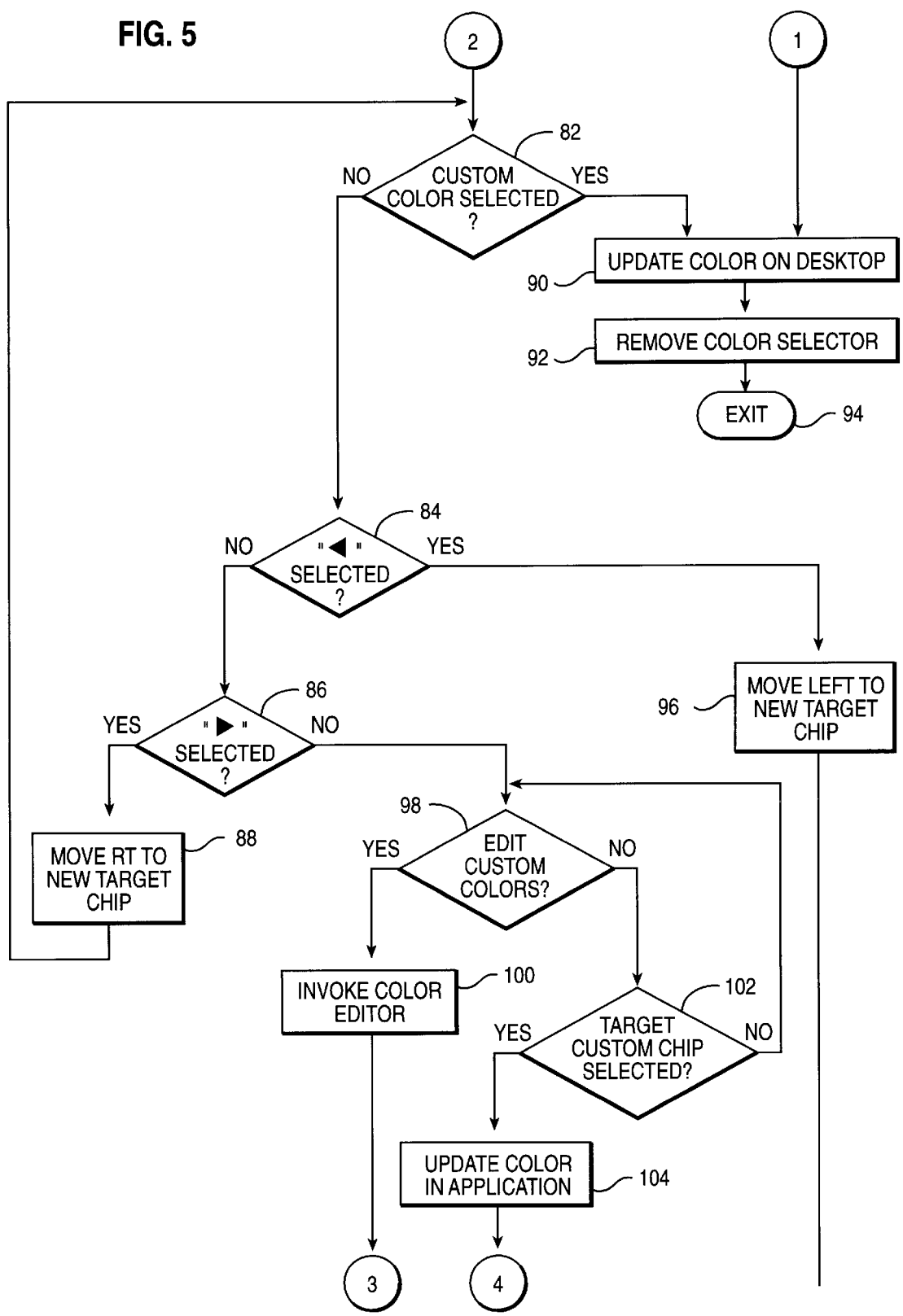

Turning now to FIG. 4, there is shown a flow diagram for defining custom colors using this invention. The procedure starts at block 60, and proceeds immediately to block 62, where a check is conducted to determine if a color choice request has been detected. If NO, the procedure continues looping awaiting a color choice request. If YES, at block 64, the procedure determines if an application has requested a color choice. If YES, at block 72, the procedure determines if the Quick Color Selector is already displayed. If NO, the Quick Color Selector is displayed as shown at block 74, and processing proceeds to block 76. Returning to block 72, if the Quick Color Selector is already displayed, the procedure checks to determine if a standard color target chip has been selected at block 76. One skilled in the art will appreciate that the Quick Color Selector dialog is relatively transient, that is, the dialog becomes visible when an application wishes the user to make a color choice. The dialog disappears immediately after the choice is made, or after the user performs some mouse or keyboard gesture that is interpreted as a request to cancel the dialog. Returning to block 76, if the check determines that a standard color target chip has been selected, processing goes to block 90 (FIG. 5), where the color is updated on the desktop for the requesting application. At block 92, the procedure removes the color selector and exits at block 94. Returning to block 76, if the standard color target chip has not been selected, a test is conducted at block 82 (FIG. 5), to determine if a custom color has been selected. If YES, processing goes to block 90, and proceeds as previously described. If NO, at block 84, the procedure determines if the left navigation button (e.g., "<") has been selected. If YES, the procedure moves left to a new target chip as shown in block 96, and returns to block 82, to determine if the user has selected the custom color. Returning to block 84, if the left navigation button has not been selected, a check is conducted at block 86, to determine if the right navigation button (e.g., ">") has been selected. If YES, the procedure moves right to a new target chip as shown in block 88, and determines if the custom color has been selected as shown in block 82. Returning to block 86, if the right navigation button has not been selected, processing proceeds to block 98, where a check is conducted to determine if the Edit Custom Colors button has been selected. If YES, the Color Editor is invoked at block 100, to enable the user to define a custom color. If NO at block 98, processing proceeds to block 102 to determine if the target custom chip has been selected. If NO, processing returns to block 98, to determine if the user still desires to edit the custom colors. If YES at block 102, the procedure causes the colors to be updated on the desktop for the requesting application as shown in block 104. The procedure then removes the Quick Color Selector as shown at block 120, and exits the procedure as shown in block 122. Returning to block 100, processing proceeds to block 106 (FIG. 6), where the procedure determines if the custom color has been defined. If NO, at block 116, the procedure allows the user to define a new value for the custom color and processing returns to block 106. If the custom color has been defined by the user at block 106, a check is carried out at block 108, to determine if the Set Custom Color button has been selected. If NO, the procedure determines if the Close button has been selected at block 118. If NO, processing proceeds to block 116, where the user defines a new value for the custom color. If YES at block 118, processing proceeds to block 112 where the Color Editor is dismissed/terminated and the procedure exits the routine at block 114. Returning to block 108, if the Set Custom Color button has been selected, the procedure updates the custom color target chip at block 110, terminates the Color Editor at block 112, and exits the procedure at block 114.

Figure 7:
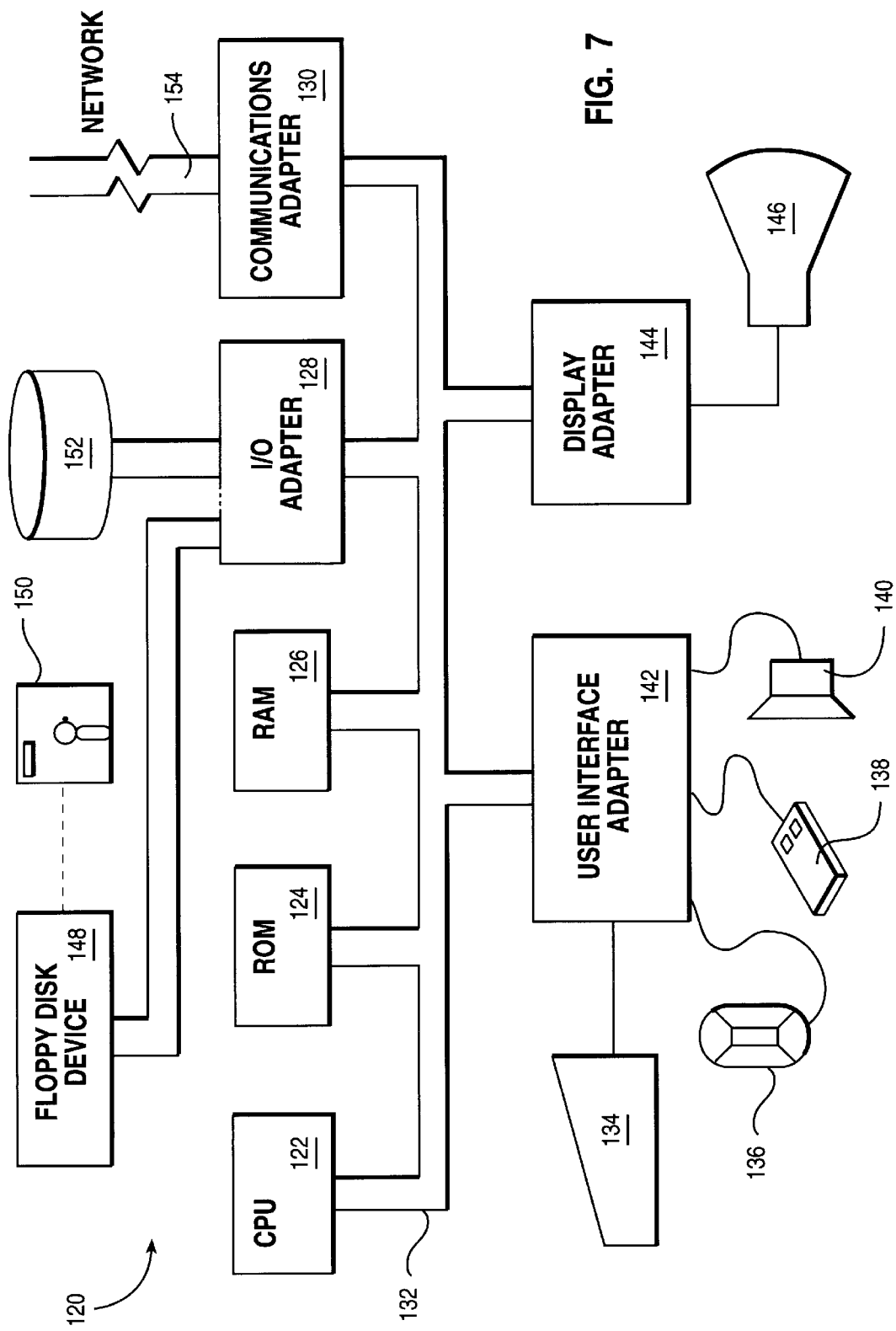
FIG. 7 is a workstation where the invention may be practiced.

Turning now to FIG. 7, there is shown a workstation/data processing system 120 where the invention may be practiced. The workstation 120, contains a CPU 122, connected to random access memory (RAM) 126, read only memory (ROM) 124, through a bus 132. The CPU 122, is capable of communicating with a plurality of Input/Output (I/O) devices through I/O adapter 128. Hard disk storage 152, provides permanent storage of data/information for use by the CPU 122. A floppy disk device 148, provides means for inputting data from a computer program product having a computer readable medium such as a floppy diskette 150. One skilled in the art will appreciate that the computer program of this invention may be inputted to the CPU 122, via the floppy diskette 150. A display monitor 146, is provided to allow a user to observe the execution of data on the CPU 122. Data can also be inputted to the CPU 122, through keyboard 134, and microphone 136. Data displayed on monitor 146, can be manipulated using mouse 138. Output from programs operating on CPU 122, may be obtained over speaker 140. The workstation 120 may be connected to a network (not shown), through communication adapter 130.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A graphical user interface for creating a color displayed on a computer desktop of a data processing system, comprising:

generating a request to change said color on the computer desktop;

presenting a quick color selector on said computer desktop having a plurality of fixed colors, a plurality of user-editable colors and at least one navigation button connected to a position indicator, said quick color selector disappearing immediately from user viewing upon selection of a selected one of said fixed or user-editable colors; and identifying one of said plurality of user-editable colors by moving said position indicator across said plurality of user-editable colors; and selecting said one of said identified user-editable colors with a pointing device to change said selected color on said computer desktop and immediately terminating the presentation of said quick color selector.

2. The method of claim 1 wherein the step of identifying further comprises:

manipulating said navigation button to move said position indicator from left to right across said plurality of user-editable colors.

3. The method of claim 1 wherein said identifying step further comprises:

manipulating said navigation button to move said position indicator from right to left across said plurality of user-editable colors.

4. The method of claim 1 wherein said identifying step further comprises:

selecting an edit button to define a different one of said plurality of user-editable colors; and invoking a color editor in response to the selection of said edit key and defining said different one of said plurality of user-editable colors using said editor.

5. An apparatus for creating a color displayed on a computer desktop of a data processing system, comprising:

means for generating a request to change said color on the computer desktop;

means for presenting a quick color selector on said computer desktop having a plurality of fixed colors, a plurality of user-editable colors and at least one navigation button connected to a position indicator, said quick color selector disappearing immediately from user viewing upon selection of a selected one of said fixed or user-editable colors;

means for identifying one of said plurality of user-editable colors by moving said position indicator across said plurality of user-editable colors; and means for selecting said one of said identified user-editable colors with a pointing device to change said selected color on said computer desktop and immediately terminating the presentation of said quick color selector.

6. The apparatus of claim 5 wherein the means of identifying further comprises:

means for manipulating said navigation button to move said position indicator from left to right across said plurality of user-editable colors.

7. The apparatus of claim 5 wherein the means of identifying further comprises:

means for manipulating said navigation button to move said position indicator from right to left across said plurality of user-editable colors.

8. The apparatus of claim 5 wherein the means for identifying further comprises:

means for selecting an edit button to define a different one of said plurality of user-editable colors; and means for invoking a color editor in response to the selection of said edit key and defining said different one of said plurality of user-editable colors using said editor.

9. A computer program product having a computer readable medium having computer program logic recorded thereon for a graphical user interface for creating a color displayed on a computer desktop of a data processing system, comprising:

computer readable means for generating a request to change said color on the computer desktop;

computer readable means for presenting a quick color selector on said computer desktop having a plurality of fixed colors, a plurality of user-editable colors and at least one navigation button connected to a position indicator, said quick color selector disappearing immediately from user viewing upon selection of a selected one of said fixed or user-editable colors; and computer readable means for identifying one of said plurality of user-editable colors by moving said position indicator across said plurality of user-editable colors; and computer readable means for selecting said one of said identified user-editable colors with a pointing device to change said selected color on said computer desktop and immediately terminating the presentation of said quick color selector.

10. The computer program product of claim 9 wherein said computer readable medium means for identifying further comprises:

computer readable means for manipulating said navigation button to move said position indicator from left to right across said plurality of user-editable colors.

11. The computer program product of claim 9 wherein said computer readable medium means for identifying further comprises:

computer readable means for manipulating said navigation button to move said position indicator from right to left across said plurality of user-editable colors.

12. The computer program product of claim 9 further comprising:

computer readable means for selecting an edit button to define a different one of said plurality of user-editable colors; and computer readable means for invoking a color editor in response to the selection of said edit key and defining said different one of said plurality of user-editable colors using said editor.

\* \* \* \* \*